D. WILSON.
Dumping Wagon.
No. 97,846. Patented Dec. 14, 1869.
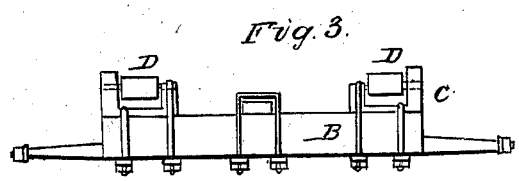
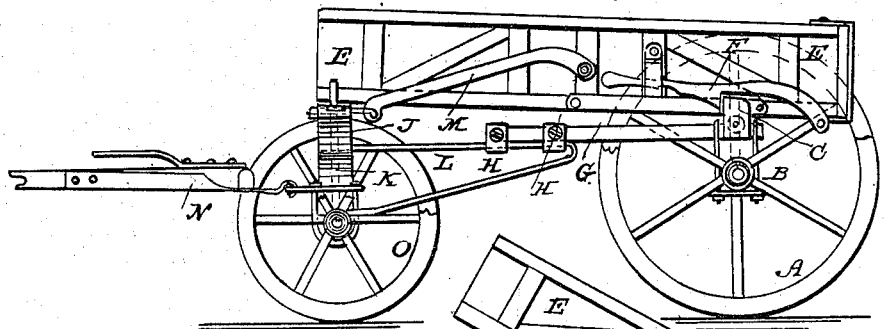
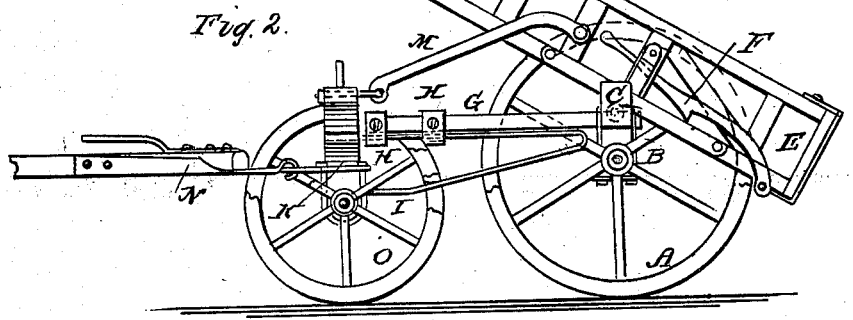
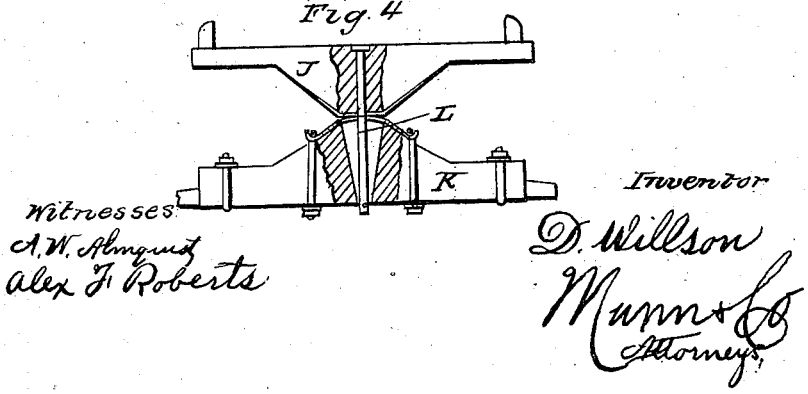
Witnesses
A. W. Almquist
Alex F. Roberts
Inventor
D. Willson
Munn & Co
Attorneys

UNITED STATES PATENT OFFICE.

DANIEL WILLSON, OF ISHPEMING, MICHIGAN.

IMPROVED DUMPING-WAGON.

Specification forming part of Letters Patent No. 97,846, dated December 14, 1869.

*To all whom it may concern:*

Be it known that I, DANIEL WILLSON, of Ishpeming, in the county of Marquette and State of Michigan, have invented a new and useful Improvement in Dump-Wagons; and I do hereby declare that the following is a full, clear, and exact description thereof, which will enable others skilled in the art to make and use the same, reference being had to the accompanying drawings, forming part of this specification, in which—

Figure 1 is a side view of my improved dump-wagon, part of the wheels being broken away to show the construction, showing the position of the parts when drawing the load. Fig. 2 is the same view as Fig. 1, but showing the parts in their position when dumping the load. Fig. 3 is a detail view of the rear axle. Fig. 4 is a detail view of the forward axle and bolster, part being broken away to show the construction.

Similar letters of reference indicate corresponding parts.

My invention has for its object to furnish a simple, strong, and convenient dump-wagon, which shall be so constructed and arranged that it may be dumped, when required, by backing the team; and it consists in the construction and combination of various parts of the wagon, as hereinafter more fully described.

A are the rear wheels, and B is the rear axle. To the axle B, near its ends, are secured, by clips, castings C, which serve as bearings for the rollers D, upon which the rear part of the wagon-body E rests, and upon which it moves back and forth, the outer arms of the castings C extending up a little at the sides of said body, to serve as stakes to keep the said body E in place, and also to serve as catches for the lock-levers F to catch upon. The rear ends of the lock-levers F are pivoted to the rear parts of the sides of the body E, and their forward parts pass through long keepers attached to the sides of said body. Upon the under sides of the levers F are formed shoulders, which, when the body E has been drawn forward and downward to its ordinary position, catch upon the upwardly-projecting arms or catches of the castings C, and hold the body E securely locked in position until the said levers F are again raised.

G is the stationary reach, the rear end of which is securely and rigidly attached to the rear axle B. To the forward part of the reach G are attached keepers H, one or more, through which passes and slides back and forth the upper or horizontal arm of the sliding reach I. The forward end of the upper or horizontal arm of the sliding reach I enters a mortise in the forward bolster, J, where it is secured by the king-bolt, which passes through it. The forward end of the lower or inclined brace-arm of the sliding reach I enters a mortise or slot in the forward axle K, where it is secured in place by the king-bolt, which passes through it.

L is the king-bolt, which passes through the bolster J and the axle K, and which is secured in place with a key. The hole in the axle K, through which the king-bolt L passes, is elongated, in its upper part, in the direction of the length of said axle, as shown in Fig. 4, to give a lateral play to the connection, to enable the wagon to accommodate itself to rough and uneven ground. The forward end of the wagon-body E rests upon the forward bolster J, and is kept in place laterally by short stakes attached to said bolster near its ends. The height of the forward axle and forward bolster should be so adjusted that the forward wheels O may pass wholly or partially beneath the body E, for convenience in turning the wagon.

M are connecting-bars, the forward ends of which are pivoted to the rear side of the bolster J, and the rear ends of which are pivoted to the sides of the wagon-body E, at or near its middle part, as shown in Figs. 1 and 2.

By this construction and arrangement, when the lock-levers F are raised, and the team is backed, the sliding reach I will slide back upon the stationary reach G, while the bars M will push the wagon-body E back upon the rollers D, and at the same time tend to raise the forward end of said body until said forward end is overbalanced, as shown in Fig. 2, dumping the load.

As the team moves forward, the sliding reach I slides forward upon the stationary reach G, the bars M draw the body E forward and downward into its place upon the forward bolster, J, and the lock-levers F catch upon the catches or arms of the castings C, again locking the said body in place.

N is the tongue, which is attached to the forward axle K by hooks and eyes or other easily detachable means, so that the team can be easily and quickly detached from one wagon and attached to another, allowing one wagon to be kept at the bank, being filled, while the other is being drawn away and dumped.

Having thus described my invention, I claim as new and desire to secure by Letters Patent—

1. The combination of the connecting-bars M with the wagon-body E, forward bolster, J, sliding reach I, and stationary reach G, substantially as herein shown and described, and for the purpose set forth.

2. An improved dump-wagon, formed by the combination of the rear wheels A, rear bolster, B, castings C, rollers D, wagon-body E, lock-levers F, stationary reach G, sliding reach I, forward bolster, J, forward axle, K, king-bolt L, forward wheels, O, and connecting-bars M, with each other, substantially as herein shown and described, and for the purpose set forth.

The above specification of my invention signed by me this 14th day of August, 1869.

DANIEL WILLSON

Witnesses:
JULIUS ROPES,
K. E. WILKINSON.